May 5, 1931. M. FALK 1,803,428
KEY CUTTING MACHINE
Filed Oct. 31, 1927
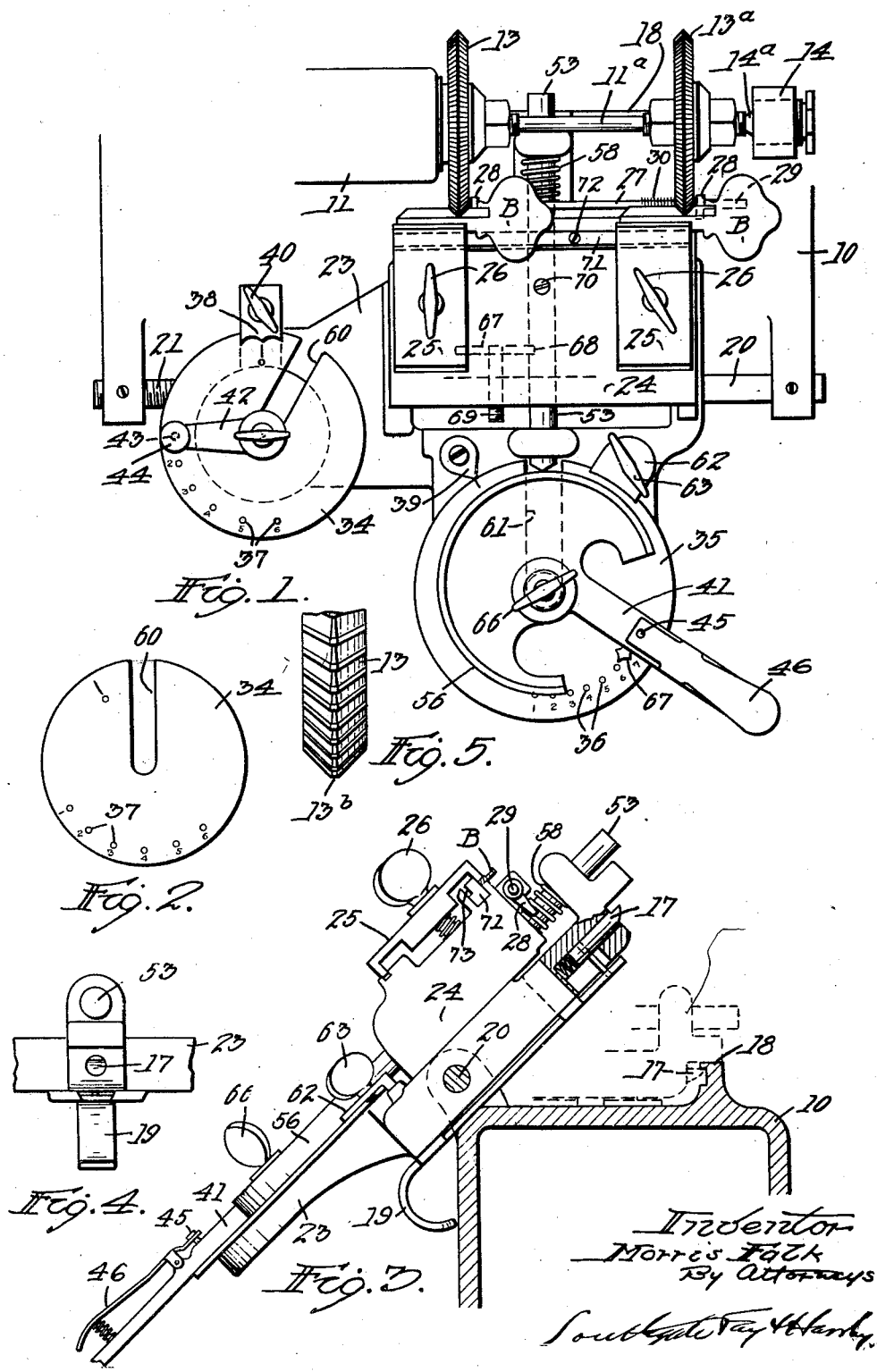

Patented May 5, 1931

1,803,428

UNITED STATES PATENT OFFICE

MORRIS FALK, OF LEOMINSTER, MASSACHUSETTS

KEY-CUTTING MACHINE

Application filed October 31, 1927. Serial No. 229,831.

This invention relates to a machine for cutting keys. It is an improvement on my patent on a similar machine, No. 1,750,218, and contains matter shown in Fig. 6 thereof which is claimed herein.

The principal objects of the present invention are to provide improved means for governing the depths of the cuts and the spaces between them, without the use of templates, depth keys, or other pattern; to provide this means in the form of more readily detachable and removable code discs; to provide improved means for moving the blanks toward and from the cutter and in a lateral direction so as to get the desired spaces and depths of cut; to provide a cutter which can be used to cut keys of all manufactures and insure an accurate fit, and to provide a practical adjustment for depths of cut.

The invention also involves improvements in other details of construction and combinations of parts as will appear.

Reference is to be had to the accompanying drawings in which

Fig. 1 is a plan of a preferred embodiment of this invention shown as adapted to cut a blank either by code number or with a pattern:

Fig. 2 is a plan of one of the removable discs;

Fig. 3 is an end elevation of the machine partly in section;

Fig. 4 is an edge view of the carriage, and

Fig. 5 is an edge view of my improved cutter;

This machine is a universal machine which can be used as stated to cut blanks from master keys or for cutting blanks by code numbers in use by the different manufacturers. It is intended for use, not by the manufacturers especially, although it can be used by them, but for cutting keys in repair shops and especially in shops of locksmiths and the like.

The machine involves a base 10 as usual on which is a headstock 11 with a spindle having a rotary cutter 13 thereon. The tail stock 14 is shown.

The machine is provided with a shaft 20 extending longitudinally thereof and having upon it a screw 21 for adjusting longitudinally a frame 23 which is pivoted on the shaft 20 to swing from horizontal position, shown especially in Fig. 1 to an upright position as shown in Fig. 3.

On this frame is a carriage 24 preferably carrying two clamps 25, although in some cases one of these clamps can be omitted. These clamps or jaws are screwed down by thumb screws 26 to clamp the blank B or the master key, if that is used, in the same relative positions on the two clamps.

On the front of this carriage 24 is a freely turning shaft 27 having two gauges 28 thereon. It is provided with a knurled end 29 or handle so that it can be turned up and down, so that these gauges 28 can be brought up into contact with the blank B. This shaft is provided with a coiled spring 30 having one end fixed to the shaft and the other to the carriage. This automatically moves the gauges out of the way, when not being used. The blank and key are shifted in the jaws until they both come into the same relationship with the two gauges 28, that is, these gauges are set up against the same element on both. Then the clamps are tightened and these gauges turned down to the position shown in Fig. 3 where they are out of the way. As the cutter 13 is rotating constantly, this cutter will cut a notch in the blank exactly in the desired position.

I have already stated that the screw or rack 21 is a part of the shaft 20. This screw is engaged by a pinion which is mounted on the carriage 23, and by turning it through the handle 42 the frame 23 and carriage 24 will move along the shaft 20 in accordance with the rotation of this pinion, so as to bring it to the proper positions to space the notches the right distance apart.

In cases where the key is lost, the number can be obtained from the lock or otherwise, and used to control the cuts. For this purpose, two discs 34 and 35 are used. They are mounted on shafts. I have shown each disc as being provided with a series of perforations as 36 and 37 which are spaced in accordance with the code of the manufacturer of the key. These codes are used for spacing the notches of the keys and for the depths in cut. Each manufacturer has his own code and of course there is a separate one for the spacing and for the depths. The code of only one manufacturer is indicated on the discs. These two discs, it will be understood, are detachable and adjustable, but in the use of the device are stationary. To make them readily detachable and replaceable each one has a radial slot 60 and 61. They are set so that the dial mark 0 on each disc registers with a fixed pointer 38 and 39 respectively. One of these pointers is held down by a thumb screw 40 which will loosen the pointer to remove and replace the disc by others when that is desired or to turn the discs. The other disc is held down by a clamp 62 and thumb screw 63. The clamps 62 and 38 are wider than the slots 60 and 61. The discs are both set at the so-called zero point where the mark is shown, and then these discs can be used from then on to arrange for cutting the keys of the manufacturer whose code is indicated thereon by the series of perforations.

On the ends of the central shafts are fixed two arms 42 and 41 respectively. On the end of the arm 42 is a spring pin 43 having a head 44 for raising it out of one of the holes in the disc 34, so that this arm can be put in one hole after the other of a certain series. Each time it is changed it will move the carriage 24 along the screw 21 to position the blank in a new place with respect to cutter 13. This, of course, is done when the carriage is drawn back. The arm 41 also has a spring pin 45 operated by a lever 46 extending out over the end of the arm 41. This works in the same way on the disc 35 to move the carriage 24 toward and from the cutter through a cam 56 to which the arm 41 is fixed. The cam 56 cooperates with a rod 53 on the slide. Obviously this will move the slide 24 in and out as in the other case. The rod 53 with a spring 58 is used to return the slide and keep the rod 53 always in contact with the cam. The cam is held on the shaft by a thumb nut 66. A pointer 67 is shown on the handle 46.

It will be seen therefore that the carriage can be drawn back from the cutter by the arm 41 and then moved along by the arm 42 and the pin 43 put back in another hole in the disc to positively locate the carriage in that respect. Then the arm 41 can be moved along to the next hole desired and the pin 45 allowed to slip into it so that the depth of the cut will be positively controlled. These operations are performed ordinarily when the structure comprising the frame 23 and the carriage 24 is swung back to horizontal position.

In the use of this machine the two blanks B are inserted into the two jaws 25 and one of them clamped in position. Gauges 28 are then turned upwardly so as to engage either the blank or the key and the other one is moved along until that is also engaged in that way and then clamped. The gauges are then turned down. The user does not have to look over the top of the carriage or in behind the center. Now this holder is turned down so that a spring latch 17 comes down into a notch in a rest 18. In this way the frame 23 is positively positioned and held in position by gravity. The latch 17 is released by a finger hook 19.

The two clamps 25 can be used to clamp two blanks B and they are both made at the same time and in exactly the same pattern by use of the cutter 13 and a second cutter 13a.

The latter cutter is mounted on an extension shaft 11a secured on the main shaft and preferably centered on the rest 14 by a conical center 14a. The two blanks are spaced in the same way as above described by the gauge 28. Only one cutter 13 is used when cutting a key from a master key, or in cutting a single key.

To get an adjustment to have the key cut deeper or shallower it is necessary to move the rod 53 in front of the cam in or out. This adjustment of the shaft is made by a screw 69 having a circular disc 67 attached thereon which fits in to a slot 68 in the rod 53. By moving the screw forward it engages that rod in the slot and moves the rod forward. By turning the screw the other way it engages the other side of the slot and moves the rod in the opposite direction. When the adjustment is made screw 70 is tightened against the rod to hold it in the fixed position.

On the carriage is a reversible block 71 adapted to be secured in position in a slot either end around by a screw 72. One side 73 of the block is cut away. When cutting keys that have wide blades and which are cut deep the block has to be placed with the cut-away portion at the front toward the cutter.

Each individual manufacturer has adopted a special style cutter providing a particular special pitch or angle. It has been impossible to take any cutter used by any manufacturer and cut all of keys from code and insure an accurate fit. The principles of operation of a pin tumbler lock is as follows:—

When the key cut to a desired combination is inserted in a plug in the lock, the tumblers, so-called, drop to the center and bottom of each round cut, and with the inserted key, these tumblers are properly seated on the bottom of these cuts, and the top of these tumblers provide a flush or even surface with the plug, in that way, permitting the plug to be turned in the lock. Now the shape of the cutter employed by other manufacturers is a V shape, yet the principle is the same as any other pin tumbler lock. I have found that if I provide a pitch or angle to the cutter and flatten the edge of the cutter at 13b that I am able to successfully cut any of these keys and insure an accurate fit of the resultant key. The cutter is universal in operation because without changing the cutter, I can cut keys for any make lock and guarantee the resultant key to fit. The main principle that determines the fit of the key in the lock is to have a key enter the plug of the lock and have the tumblers in the plug drop to the bottom of the cut, in this way, finding its proper seat with the tops of the tumbler automatically placing themselves flush or even with the plug.

By the use of this cutter on this machine, the machine will cut from code not only keys that employ a disc or washer for tumblers, but will also cut the full range of pin tumbler locks. In its use the same cutter is always used and there is never an occasion to employ another cutter. Another thing that I wish to emphasize in this connection is that this cutter is not limited to a use in cutting automobile keys, but can be successfully used for cutting pin tumbler keys of other style, for instance, house door.

Another important feature with the use of this cutter is that the flat cut when employed in the cutting of a key for a pin tumbler lock permits a slight error on the part of the operator in setting his key blank for cutting. To better illustrate this, I will refer to the cutting, for instance, of a Sargent key. In the Sargent keys a rounded cut is used. Now the point of the pin tumbler when this key is inserted in the lock must accurately set in the center of this cut and if a key is cut somewhat offspace it will be the tendency of this pin tumbler to seek its rest on a rounded part of this cut, in that way making all the tumblers in this plug rest somewhat higher. Now in the use of my cutter with the flat edge, if the key is cut a little offspace, this condition will not prevail, because the tumbler is somewhat pointed, and it is only the extreme point of the tumbler that rests on the cut, so that in providing a flat cut, even though the key is somewhat offspace the key will fit.

It will be seen that the discs are readily detachable to be replaced by discs perforated according to the codes of other manufacturers; also two keys can be cut at the same time by code numbers.

Although I have illustrated and described only one form of the invention I am aware of the fact that modifications can be made therein by any person skilled in the art without departing from the scope of the invention as expressed in the claims.

Therefore, I do not wish to be limited to all the details of construction herein shown and described, but what I do claim is:—

1. In a key cutting machine, the combination with a carriage and a cutter, of a shaft, means for moving the carriage relative to the cutter, a disc on the carriage having an opening adapted to receive the shaft, an arm on said shaft projecting over the disc, and means operated by the shaft for controlling the amount of movement of the carriage.

2. In a key cutting machine, the combination with a carriage, oscillatable means for moving the carriage back and forth to locate it with respect to a cutter, a disc on the carriage having a radial slot, a shaft on the carriage, means cooperating with the shaft for moving the carriage, said slot in the disc being adapted to receive the shaft so that the disc can be attached and removed readily, and an arm centered on said shaft and projecting over the disc for controlling the amount of movement of the carriage.

3. In a key cutting machine, the combination with a carriage, of a shaft, means connected with the shaft for moving the carriage, a disc having a radial slot adapted to slide over the shaft and be readily removed therefrom, a scale on the disc, an arm centered on the shaft and adapted to cooperate with the scale to control the setting of the disc, and a clamp for clamping the disc in stationary position, said clamp having a clamping edge wider than the slot so as to be able to clamp the disc in all positions thereof.

4. In a key cutting machine, the combination with a cutter, of a pivoted work support, a base on which said work support is carried, said base having a forward projection provided with a notch, a spring latch on the work support for engaging in said notch and holding the work support in stationary position, and a finger hook connected with the latch and extending to the opposite side of the pivot for releasing the latch.

5. In a key cutting machine, the combination with a rotary cutter, of a carriage having means thereon for clamping the work, a disc mounted on the carriage and having a scale thereon, an arm pivoted at the center to swing over the scale, a cam rigidly connected with said arm, a slidable rod in position to be engaged by the cam and moved by it as it turns, said rod being connected with the carriage for moving the carriage toward and from the cutter as the cam is turned, and means for adjusting the rod relatively to the carriage.

6. In a key cutting machine, the combination with a carriage having a clamp thereon for securing a blank, of a rotary cutter, a reversible block carried by the carriage having two faces at different distances from the cutter, whereby it can be turned around to allow the cutter to cut deeper for a different type of key, and means for securing the block in either position.

7. In a key cutting machine, the combination with a tilting work supporting carriage, of a shaft mounted thereon, means for moving the carriage parallel with the axis of said shaft, a disc, a scale on the disc, an arm centered and fixed on the shaft, means operated by the shaft adapted to cooperate with the scale to control the setting of the disc, and a clamp for clamping the disc in stationary position adapted to clamp the disc in all positions thereof.

In testimony whereof I have hereunto affixed my signature.

MORRIS FALK.